(12) United States Patent  
Das et al.

(10) Patent No.: US 11,764,946 B2  
(45) Date of Patent: Sep. 19, 2023

(54) AUDIT CHAIN FOR PRIVATE BLOCKCHAIN

(71) Applicant: SAP SE, Walldorf (DE)

(72) Inventors: Saumyadipta Das, Bhubaneswar (IN); Francois Vigneron, Kehl am Rhein (FR); Andreas Grosche, Mannheim (DE); Joe A. Kattackal, Bangalore (IN); Markus Brugger, Frickingen (DE); Mark Teichmann, Lubeck (DE); Manoj Karjala Chandrasekar, Easton, PA (US); Vigneswaran Padmanaban, King of Prussia, PA (US); Srikanth Rajamani, Malvern, PA (US); Matthew Morabito, Newtown Square, PA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/714,283

(22) Filed: Apr. 6, 2022

(65) Prior Publication Data

US 2022/0231834 A1    Jul. 21, 2022

Related U.S. Application Data

(63) Continuation of application No. 16/454,425, filed on Jun. 27, 2019, now Pat. No. 11,356,242.

(51) Int. Cl.
*H04L 29/06* (2006.01)
*H04L 9/06* (2006.01)
(Continued)

(52) U.S. Cl.
CPC ........ *H04L 9/0637* (2013.01); *G06F 16/1824* (2019.01); *G06F 16/1865* (2019.01); *H04L 9/3236* (2013.01); *H04L 9/3239* (2013.01)

(58) Field of Classification Search
CPC ... H04L 9/0637; H04L 9/3236; H04L 9/3239; H04L 2463/061; H04L 63/108;
(Continued)

(56) References Cited

U.S. PATENT DOCUMENTS

2016/0162897 A1* 6/2016 Feeney .................. H04L 9/3247  
  705/71  
2017/0250972 A1   8/2017 Ronda et al.  
(Continued)

FOREIGN PATENT DOCUMENTS

CN    110506409 A  * 11/2019  ......... G06F 16/2308

OTHER PUBLICATIONS

892 Form dated Jul. 9, 2021 which was received in connection with U.S. Appl. No. 16/454,425.
(Continued)

*Primary Examiner* — Mahfuzur Rahman  
(74) *Attorney, Agent, or Firm* — Buckley, Maschoff & Talwalkar LLC (57) ABSTRACT

Provided is a system and method for verifying a blockchain using an external audit chain. The system may include an engine which facilitates communication between two or more independent blockchains. In one example, the method may include reading block data of a source data block that is stored among a hash-linked chain of data blocks on a blockchain, verifying a hash of the source block based on the block data that is read, generating a token based on the hash verification of the source block and storing the generated token in a verification block among the hash-linked chain of blocks on the blockchain to create a verification point on the blockchain, and storing a copy of the generated token in a block among a hash-linked chain of blocks on an audit blockchain that is independent from the blockchain.

20 Claims, 8 Drawing Sheets

(51) Int. Cl.
*G06F 16/18* (2019.01)
*G06F 16/182* (2019.01)
*H04L 9/32* (2006.01)

(58) Field of Classification Search
CPC .............. H04L 63/123; H04L 2209/38; G06F 16/1865; G06F 16/1824
See application file for complete search history.

(56) References Cited

U.S. PATENT DOCUMENTS

| | | |
|---|---|---|
| 2018/0191503 A1* | 7/2018 | Alwar ........................ H04L 9/14 |
| 2019/0130086 A1* | 5/2019 | Tovey .................... H04L 63/107 |
| 2019/0288850 A1* | 9/2019 | Beecham .............. G06F 21/602 |
| 2019/0340369 A1 | 11/2019 | Hadi |
| 2020/0153627 A1 | 5/2020 | Wentz |
| 2021/0281410 A1* | 9/2021 | Hain ..................... G06Q 20/065 |
| 2022/0231834 A1* | 7/2022 | Das ........................ H04L 9/3236 |

OTHER PUBLICATIONS

Notice of Allowance dated Jan. 27, 2022 which was issued in connection with U.S. Appl. No. 16/454,425.

\* cited by examiner

AUDIT CHAIN FOR PRIVATE BLOCKCHAIN

CROSS-REFERENCE TO RELATED APPLICATION(S)

The present application is a continuation of U.S. patent application Ser. No. 16/454,425, filed on Jun. 27, 2019, in the United States Patent and Trademark Office, the entire disclosure of which is incorporated herein for all purposes.

BACKGROUND

Blockchain provides a number of benefits with respect to a traditional centralized database. For example, in a centralized database a single entity is in control of the data. In contrast, in blockchain no single entity is in control of the data, but rather a decentralized group of peer nodes (typically untrusting parties) must agree before data can be added to the blockchain. As another example, the blockchain itself is stored on a distributed ledger that is replicated among the peer nodes making it fault-tolerant (does not have a single point of failure) which is not provided by a centralized database. As another example, blockchain is also secure because the blocks themselves are linked to one another with hashes creating an immutable ledger (tamper resistant).

Entities that participate in document-reliant industries such as accounting and tax are required by law to ensure the authenticity and integrity of their data. Example legislation includes the US Sarbanes-Oxley Act and the Council Directive 2010/45/EU, to name a few. For example, the latter calls for reliable audit trails as a way to ensure authenticity and integrity of data. However, technical mechanisms to ensure the reliability of audit trails are not defined by law. Instead, the burden of proving the reliability of the audit trail relies on the owner of the data. These industries could benefit from the use of blockchain as a secure storage mechanism. However, government or auditing entities may need to be participants of the blockchain in order to trust such audit trails.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Blockchain is a database technology (i.e., a distributed ledger) that enables participants (i.e., nodes) to hold copies of the stored data. In typical blockchain use cases such as digital currencies and cross-border logistics, nodes are distributed creating a decentralized network of nodes. Blockchain functions such as reading data from, writing data to, copying data from the blockchain, etc. are managed in a manner that participants are comfortable with the integrity and authenticity of the data stored on chain. These scenarios assume that participants have access or can gain access to the chain data. This is often seen as a filter criterion to decide whether a blockchain database is preferable to a unique central database.

Businesses and public sector organizations are required by law to ensure the authenticity and the integrity of their data. These obligations can be found in various fields and operational areas such as accounting, tax reporting, data protection, product safety and process compliance to name a few. Many legislations such as the US Sarbanes-Oxley Act and Directive 2010/45/EU call for reliable audit trails as a means to ensure the authenticity and integrity of data. Audit trails have become a wide-spread (often legally mandated) approach to ensure legal and tax compliance. They are usually offered by default in most business applications and services. However, the technical mechanisms to ensure the reliability of audit trails are not defined by law. Therefore, the burden of proving the reliability of audit trails lies on audited organizations which creates uncertainty as to whether the processes that they have defined, implemented and documented for audit trailing are reliable enough.

Storing audit trail information on blockchain arguably would level up the reliability of audit trails, e.g. by making it more difficult manipulate individual trail records. However, operating such a blockchain purely for the purpose of audit trailing would have probative value only to the degree to which auditors trust blockchain participants. One could also argue that the government itself could operate a node (i.e., participate in the auditing blockchain), but no government is currently known to be offering the possibility to store such details on a chain shared with external organizations. Also data protection concerns can be raised as to whether audit trail information should be shared at all. Even the mere counting of records might provide information to participants that audited businesses prefer to keep private.

The example embodiments are directed to an audit chain and an audit chain engine which can increase the probative value of an audit trail through a combination of blockchain technologies and make it earn recognition as accepted practice and ultimately by legal backing. In particular, the audit chain engine may create verification of the integrity of a private blockchain (audited blockchain) against a public blockchain (auditing blockchain also referred to herein as an audit chain). The audit chain engine can verify a structure of the private blockchain at various intervals and store the verification as a verification token (also referred to as a private token) on the private blockchain. Furthermore, the audit chain may replicate the verification tokens and store a copy of the tokens on a publicly available audit chain. When an auditor needs to retrieve a document from the private blockchain, they can verify the integrity of the private blockchain based on a token comparison between the verification token information stored on the private blockchain with respect to the public audit chain. Thus, the audit chain can be used as a mechanism to verify the authenticity and integrity of the private blockchain. In some embodiments, the audit chain may have a reduced level of detail in comparison to the private blockchain chain being audited thereby enabling verification without having to disclose any of the private blockchain entries for which visibility should be restricted.

In some embodiments, the audit chain may store tokens from multiple different private blockchains and may be referred to as a global audit chain. The audit chain can be controlled or managed by one or more auditors such as a consortium of auditors. The auditors may change over time. In some embodiments, a global token can be created as a verification of the audit chain similar to how the verification token is created for the private blockchain. The global token can be stored on the auditor chain. Likewise, a replica of the global token can be stored on the private blockchain thereby intertwining the verification between the private chain and the auditor chain and increasing the level of trust associated therewith.

The audit chain engine can be used to facilitate data reading and writing between the private blockchain and the audit chain. The audit chain engine can retrieve data from the private blockchain and verify a source block on the private blockchain based on the read data. The verification may be stored as a verification token. The reading and storing can be performed via one or more application programming interfaces (APIs) of the private blockchain and the audit chain engine. The audit chain engine can also store a copy of the verification token on the audit chain through one or more other APIs of the audit chain engine and the audit chain itself.

As a non-limiting example, the verification and global tokens (verification content) can be used to verify the integrity of the structure of the private blockchain. For example, the verification content may indicate an "authenticity of the origin" which includes assurance of the identity of chain participants or of their providers, an "integrity of the content" which indicates that the content required according to this accreditation has not been altered, and the like. Therefore, the verification process may provide proof of integrity of the blocks within the blockchain, while an additional verification process (not specifically described herein) may verify the content stored within the blocks of the blockchain.

Figure 1:
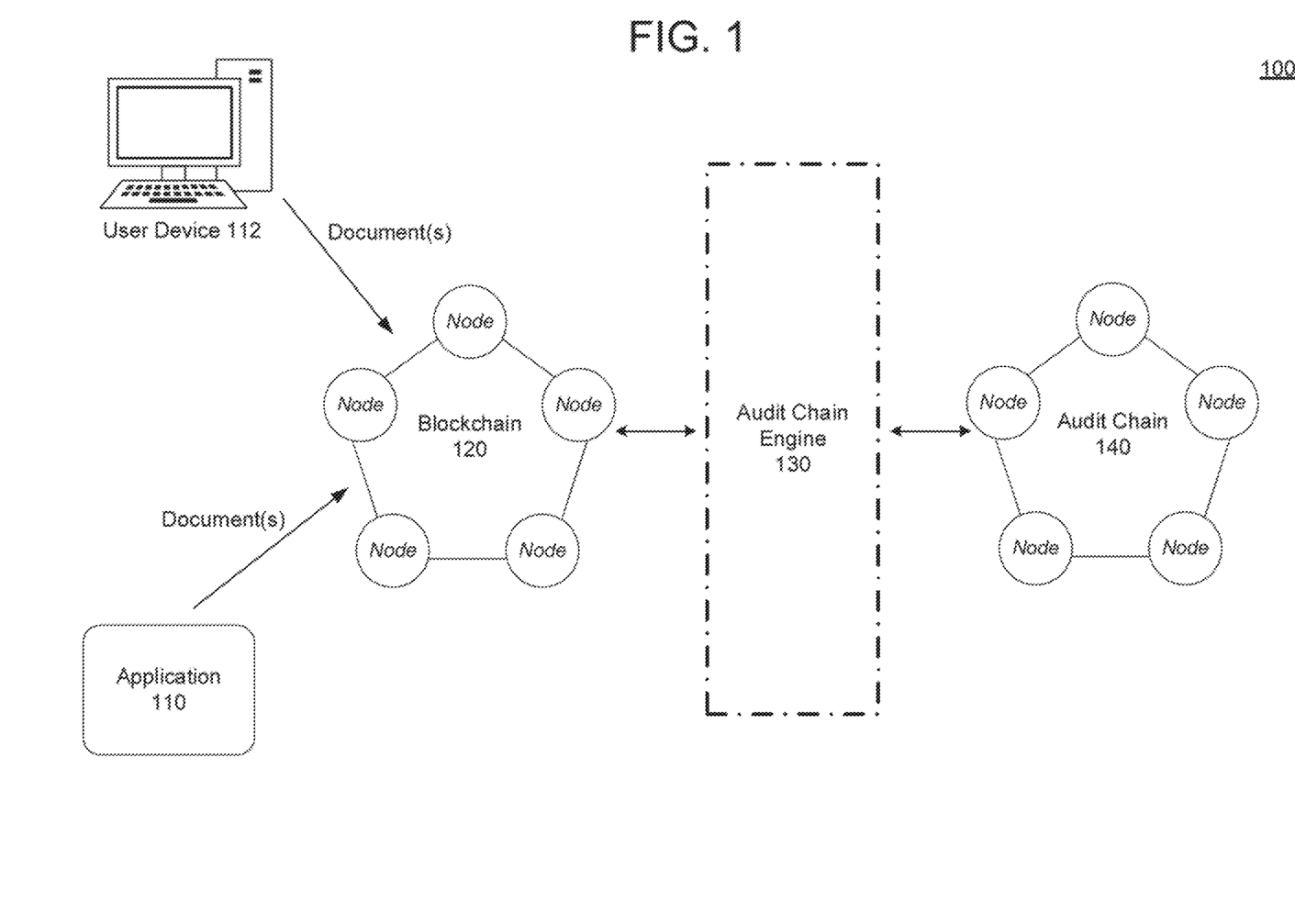
FIG. 1 is a diagram illustrating a computing environment including an audit chain engine for blockchains in accordance with an example embodiment.

FIG. 1 illustrates a computing environment including an audit chain engine 130 for blockchains 120 and 140 in accordance with an example embodiment. Referring to FIG. 1, organizations (represented by application 110 and user device 112) may store data, documents, files, media, emails, etc. on a blockchain 120. In the examples herein, the blockchain 120 may be a private or permissioned blockchain that is privately operated by members thereof. Here, the application 110 may include one or more enterprise resource planning (ERP) applications that can store client data, employee data, employer data, and the like (or hash representatives thereof), however, embodiments are not limited to any specific type of application. As another non-limiting example, the user device 112 may correspond to a workstation of a user such as an accountant, a clerk, a financial officer, a bank, etc., which stores documentation and other files on the blockchain 120.

In this example, the audit chain engine 130 may create verification points for verifying the integrity of the private blockchain 120 on a public blockchain (audit chain 140). The audit chain 140 may also be a blockchain, but permissioned to a different set of blockchain participants or with different consensus or access rules or open to the public such as by downloading and installing a software program and registering as a user on the audit chain 140. The audit chain 140 may be accessed by auditors who are designated to examine and verify accounts, and by extension, to verify audit trails.

In this example, the blockchain 120 and the audit chain 140 may each be a decentralized database (also referred to as a distributed storage system) which includes multiple nodes that communicate with each other. The decentralized database includes an immutable data structure resembling a distributed ledger capable of maintaining records between mutually untrusted parties. The distributed ledger may be overridden such as minority forks in the chain, but such action must be approved by consensus of the blockchain participants. The untrusted parties are referred to herein as peers or peer nodes. Each peer may maintain a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. A permissioned blockchain database provides secure interactions among a group of entities which share a common goal but which do not fully trust one another, such as businesses that exchange funds, goods, information, and the like.

The nodes may perform a logical function and different types can run on the same physical server. The nodes may include different types, such as a client or submitting-client node which submits a transaction-invocation (document, etc.) to an endorser (e.g., peer), and broadcasts transaction-proposals to an ordering service (e.g., ordering node). Another type of node is a peer node which can receive client-submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The distributed ledger includes a blockchain (also referred to as a chain) which is used to store an immutable, sequenced record in blocks. The ledger also includes a state database which maintains a current state of the blockchain.

The chain itself may include a transaction log which is structured as hash-linked blocks, and each block contains a sequence of N transactions. A block header may include a hash of the block's transactions, as well as a hash of the prior block's header. In this way, all transactions on the ledger may be sequenced and cryptographically linked together. Furthermore, a hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

Referring again to FIG. 1, the audit chain engine 130 can read data from one or more blocks included in the blockchain 120. The data may include block information such as block number, block hashes, total number of blocks, and the like. A trigger event may periodically or randomly cause the audit chain engine 130 to generate a verification point on the blockchain 120. In this example, the audit chain engine 130 may read a source block or blocks from the blockchain such as the most recently stored block, a previous 10 blocks, etc., and perform a hash verification on the source block or blocks. In response, the audit chain engine 130 may generate a token (e.g., a verification token) which includes information about the verification (e.g., success or failure, etc.), a block number or numbers, a chain ID, and the like. The audit chain engine 130 may store a copy of the verification token within a block on the blockchain 120. Likewise, the audit chain engine 130 may create a copy of the verification token of the blockchain 120 and store the copy on the audit chain 140. Thus, the audit chain engine 130 can create matching verification points for the blockchain 120 on both the blockchain 120 (private) and the audit chain 140 (public) which can subsequently be used to verify an integrity of the blockchain 120.

In some embodiments, the audit chain engine 130 may generate verification points within the audit chain 140. For example, a trigger event (independent from the trigger event for blockchain 120) may cause the audit chain engine 130 to read block data from one or more source blocks on the audit chain 140. In response, the audit chain engine 130 may verify the block based on block hashes, etc., and create a global token with verification information stored therein such as whether the verification was a success or not, a block number, an ID of the audit chain 140, and the like. In addition, the audit chain engine 130 may create a replica or copy of the global token of the audit chain 140 and store the global token on the blockchain 120. Thus, the audit chain engine 130 can create matching verification point for the audit chain 140 on both the blockchain 120 (private) and the audit chain 140 (public) which can subsequently be used to enhance an integrity of a verification of the blockchain 120.

Figure 2A:
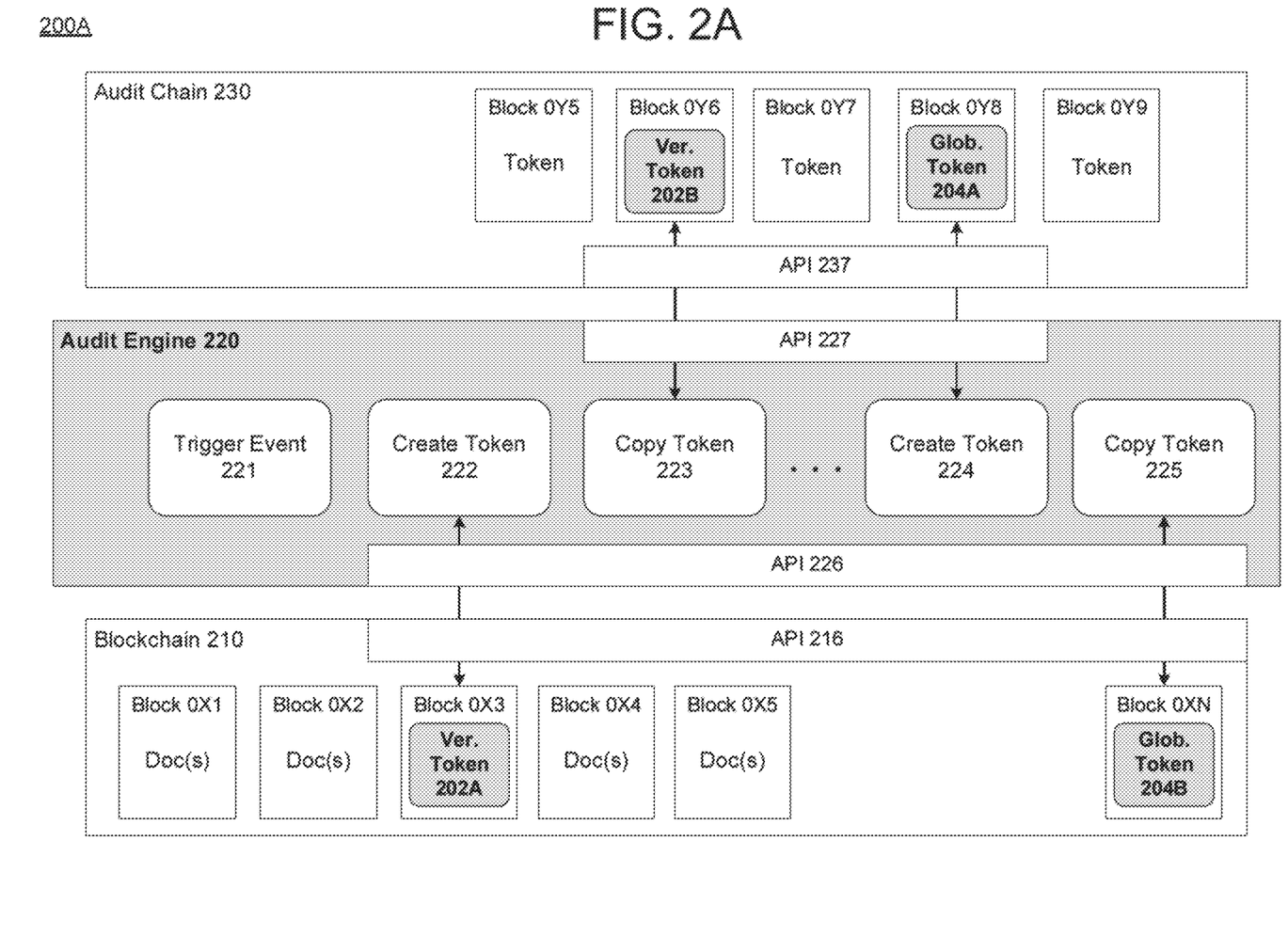
FIG. 2A is a diagram illustrating a process of verifying a blockchain via the audit chain engine in accordance with an example embodiment.

FIG. 2A illustrates a process 200A of verifying a blockchain via an audit chain engine 220 in accordance with an example embodiment. Referring to FIG. 2A, a blockchain 210 is a private blockchain which can be audited against a non-private (public) audit chain 230. In this example, the audit chain 230 may also be a blockchain, but permissioned to a different set of blockchain participants or with different consensus or access rules or open to the public such as by downloading and installing a software program and registering as a user on the audit chain 230. The audit chain engine 220 may include a step 221 in which a verification (creation of a verification token) is triggered. For example, verification tokens may be triggered based on a defined event, for example, a scheduler starting the verification at given intervals (e.g. every x minute, every hour, day, week, month, year, etc.), a calendar starting the verification at given times (e.g. every Monday at 00:00 UTC, every first day of the month) or precise dates, a block counter that counts block on accredited chains and triggers verification each x block (e.g. every 10, 100, 1000, 10000 blocks, etc.), a call by an underlying chain, for example, informing that a specific chain event requires verification by the audit chain engine.

In 222, the audit chain engine 220 may create a verification token 202 based on the triggering event in 221 and store the verification token 202 in block 0X3. The verification token may be created by reading a defined source block on the blockchain 210 (e.g. the last block created or the 1000 block since last token or the last block created before a given date) and based on relevant verification information such as the hash of the defined source block. Optionally, further block or block content details or off-chain details might be added to strengthen the probative value for auditors. The retrieved information is then used to create the verification token 202.

The runtime execution of the audit chain engine 220 may run all configured and activated verification logic settings and log related calls and their results. To further strengthen verification capabilities, the audit chain engine 220 may store verification details for a given underlying chain such as the number of verifiable blocks on an audited chain (e.g., in total, by time interval, by auditing chain, etc.) The audit chain engine 220 may also store specific block details that can be re-used for verification such as the block number and block hashes of accredited and non-accredited blocks or Merkle trees of them, and the audit chain engine 220 processing ID.

In 223, the audit chain engine 220 copies relevant details of the verification block 202 as well as further details such as the hash of the verification block itself, and creates a corresponding verification point on the audit chain (block 0Y6). In doing so, the audit chain 230 can be used as a verification for blockchain 210. For example, the verification token 202 stored in block 0Y6 of audit chain 230 can be used to verify that the verification token 202 stored in block 0X3 of blockchain 210 is a valid verification point and thus providing an extra layer of proof of integrity of the blockchain 210.

In 224, the audit chain engine 220 may create a verification point within the audit chain 230. Here, a verification point might be triggered by defined events, independently of the verification points of the blockchain 210. In response, the audit chain engine 220 may create a global token 204 which includes a verification of a source block on the audit chain 230. Likewise, in 225, the audit chain engine 220 may store a copy of the global token 204 in block 0XN of the blockchain 210.

In the example of FIG. 2A, the audit chain engine 220 includes application programming interfaces (APIs) 226 and 227 for reading and writing data to and from the blockchain 210 and the audit chain 230. Furthermore, the blockchain 210 includes a corresponding API 216 and the audit chain 230 includes a corresponding API 237 for reading and writing data. These APIs may be adjusted to support different technologies of underlying blockchains.

Figure 2B:
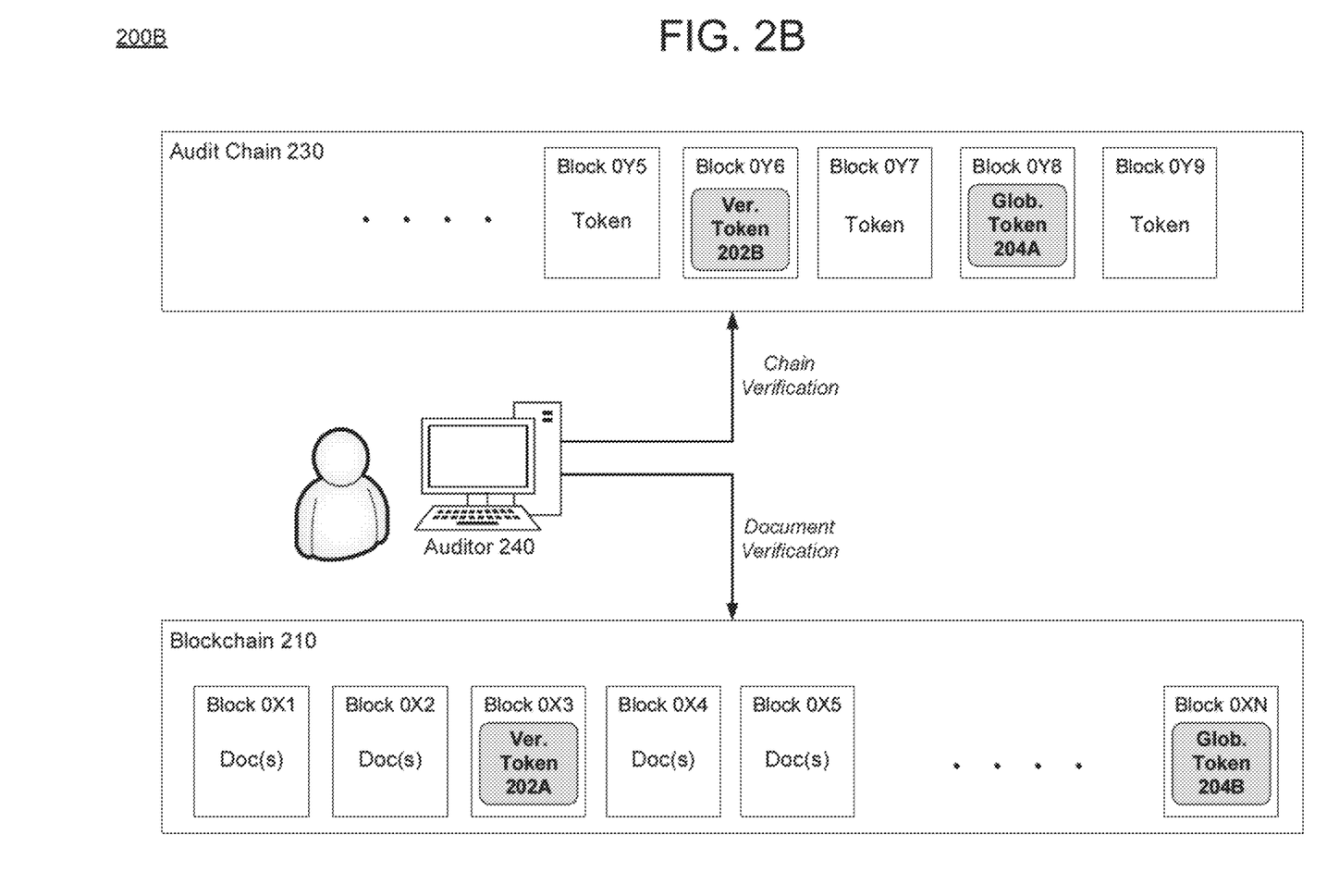
FIG. 2B is a diagram illustrating a process of an auditor verifying the blockchain based on an audit chain in accordance with an example embodiment.

FIG. 2B illustrates a process 200B of an auditor 240 verifying the blockchain 210 based on the audit chain 230 in accordance with an example embodiment. As a non-limiting example, the auditor 240 may compare the verification token 202A stored in block 0X3 of the blockchain 210 with the verification token 202B stored in block 0Y6 of the audit chain 230 as part of the verification process. Additional parts of the verification process may include verifying hashes between other blocks on the chain from a source block to a verified block, and the like. If the verifications tokens 202A and 202B match, and the hash links are verified, the auditor 240 may determine the integrity of the blockchain 210 is acceptable. Here, the verification tokens provide an additional layer of proof. Likewise, the auditor 240 may compare the global token 204A stored in the block 0Y8 of the audit chain 230 with the global token 204B stored in the block 0XN of the blockchain 210 and determine the integrity based on whether the global tokens 204A and 204B match.

According to various embodiments, the audit chain engine supports the verification of any type of underlying blockchain. The audit chain engine can be set up with minimum requirements to the data models of underlying chains. The existence of block content such as block number, block hash and hash of previous block are sufficient for setting up a verification logic. The examples herein simplify block content to one document or a few documents per block. Actually, block information can be structured in any manner supported by the data model of the underlying blockchain service. In practice, many documents or the trailing details of several documents can be put into one block without impacting the audit chain engine. To simplify the verification of blocks and for other reasons, the data model of the underlying chains might nevertheless be extended for adding enhanced functionalities to the audit chain engine, e.g. by adding specific token types and/or block types.

Underlying blockchains might offer other and complementary verification mechanisms, such as document verification. Such chain-specific verifications are not described herein and may be performed using any known mechanisms. The examples herein provide a configuration with just one audited and one auditing chain, however, it should be appreciated that the steps apply to various configurations of audited and auditing chains. For example, one audited chain may be interlinked with multiple auditing chains. As another example, multiple audited chains may be interlinked with one unique auditing chain. As another example, the audited chains and auditing chains can have multiple participating organizations and/or trailed applications. For example, multiple audited organizations writing to a same shared audited chain or multiple auditing organizations participating to the same shared auditing chain.

Figure 3A:
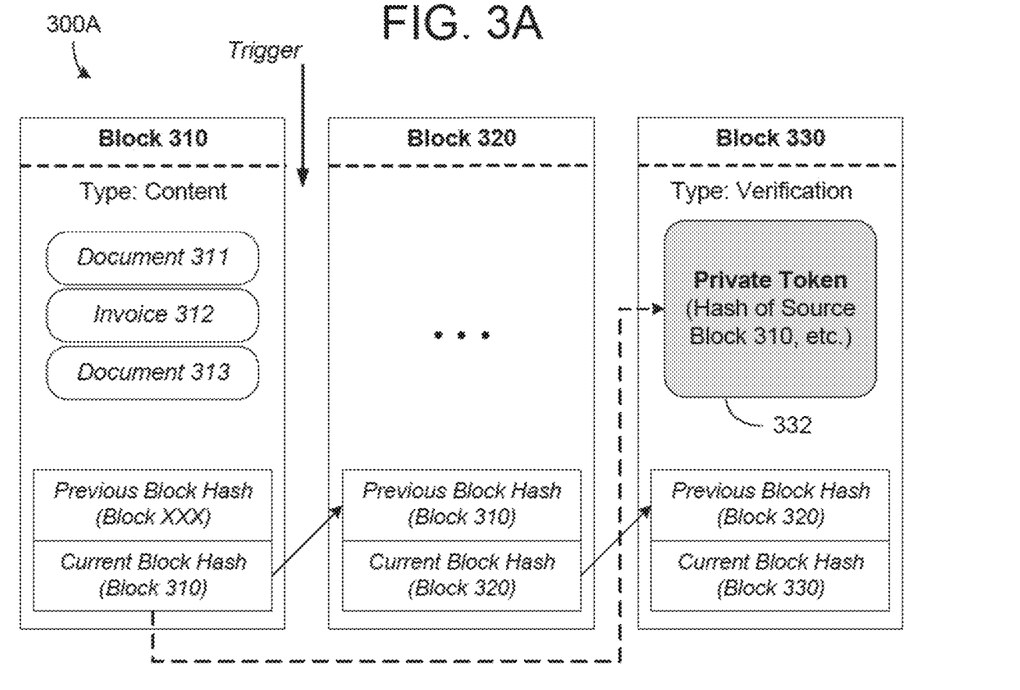
FIGS. 3A and 3B are diagrams illustrating examples of storing verification data on a blockchain in accordance with an example embodiment.
Figure 3B:
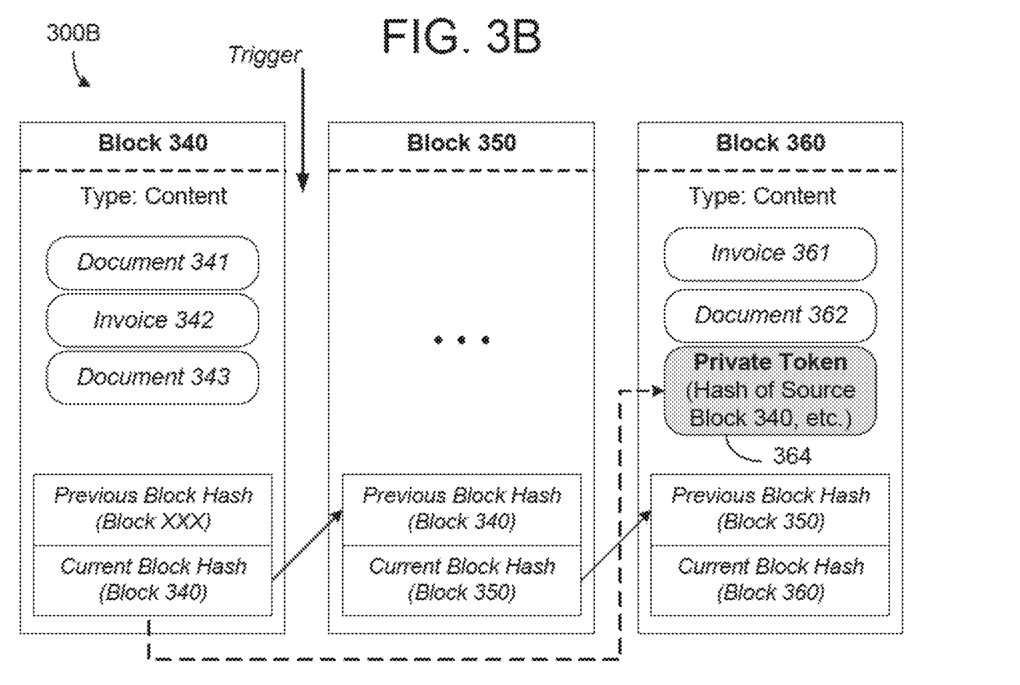

FIGS. 3A and 3B illustrate examples of storing verification data on a blockchain in accordance with an example embodiment. Referring to FIG. 3A, a process 300A of storing verification data within a unique verification block 330 is shown. In this example, blocks 310, 320, and 330 are consecutive blocks on a blockchain (not shown). Each block is linked to a previous block by storing a hash of the previous block. For example, block 330 includes a hash of a previous block 320 and a hash of itself. Meanwhile, block 320 includes a hash of previous block 310 as well as a hash of itself. Likewise, block 310 includes a hash of content that is stored in the block 310 such as document 311, invoice 312, and document 313.

In this example, the audit chain engine may receive a trigger to verify the block 310 (which is referred to as a source block). In response, the audit chain engine may retrieve hash content of the source block 310 such as a block number, a hash of a previous block, a hash of a current block, etc., from the source block 310 (and previous blocks, etc.) and verify the hash of the source block 310. In response, the audit chain engine may generate a private token 332 based on a result of the verification of the source block 310 which may include an identification of source block 310, an indication of whether the hash was successful, additional information such as number of blocks on the chain, timestamps, metadata, and the like, which can be used for integrity purposes.

In the example of FIG. 3A, the source block 310 is a content block (also referred to as a generic block) in that it can store document content provided to the blockchain. Meanwhile, a unique verification block 330 can be used to store the verification results of the source block 310. Here, the content of the block 330 may include a private token 332 with verification results of the source block 310 generated by the audit chain engine. In this example, verification data (private token 332) is stored in a separate block on the chain. The block 310 which is being verified is referred to herein as a source block or verifiable block. Meanwhile, the block 330 storing the verification results is referred to herein as a verification block because it is being used to provide a verification of another block on the chain.

FIG. 3B is similar to FIG. 3A in that three blocks 340, 350, and 360 are linked together using hashes. Here, block 340 includes document 341, invoice 342, and document 343. In this example, a trigger is received and verification of block 340 is performed by the audit chain engine. For example, the audit chain engine may retrieve content from the source block 340 including hash data, block number, block content, etc. and perform a verification of the hash. Similar to the process in FIG. 3A, the audit chain engine may generate a private token with verification results of the source block 340. However, in this example, the audit chain engine may store a signature package 364 into a content block 360 instead of a unique verification block. In this case, the content block 360 may also store trailing application content such as an invoice 361 and document 362 (or hash representatives thereof).

The audit chain engine may also support the verification of chains by the verification or re-verification of the chaining integrity and of their verified blocks. Chaining integrity may be verified by checking the integrity of the chain by standard blockchain verification mechanism, the integrity of verified blocks (which have already been verified by the audit chain engine), the consistency of source/verification block pairs, and the like. In addition, the audit chain engine may log verification block details.

The verification of blocks may be done by verifying individual blocks which may include reading the private tokens on the chain (such as the private tokens 332 and 364 shown in FIGS. 3A and 3B), finding the related source blocks, retrieving the verification-relevant input information from source blocks (e.g. the hash of blocks, etc.), verifying the input against the private token versions of it. If all verified source blocks in a selected time frame can be verified and the chain is also reported to be valid, the information on the chain can be presumed trustworthy.

Figure 4A:
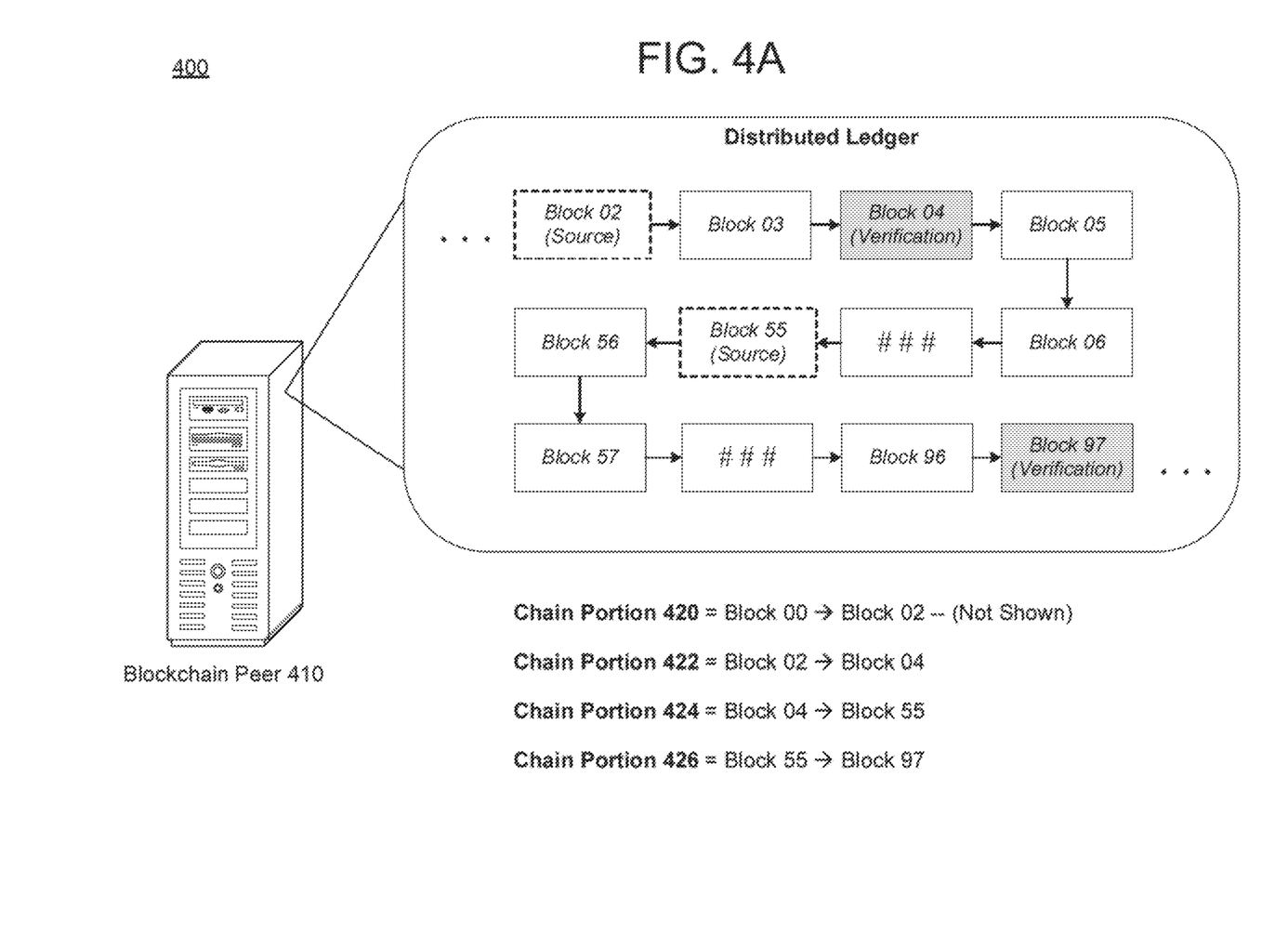
FIGS. 4A and 4B are diagrams illustrating processes of auditing chain portions in accordance with an example embodiment.
Figure 4B:
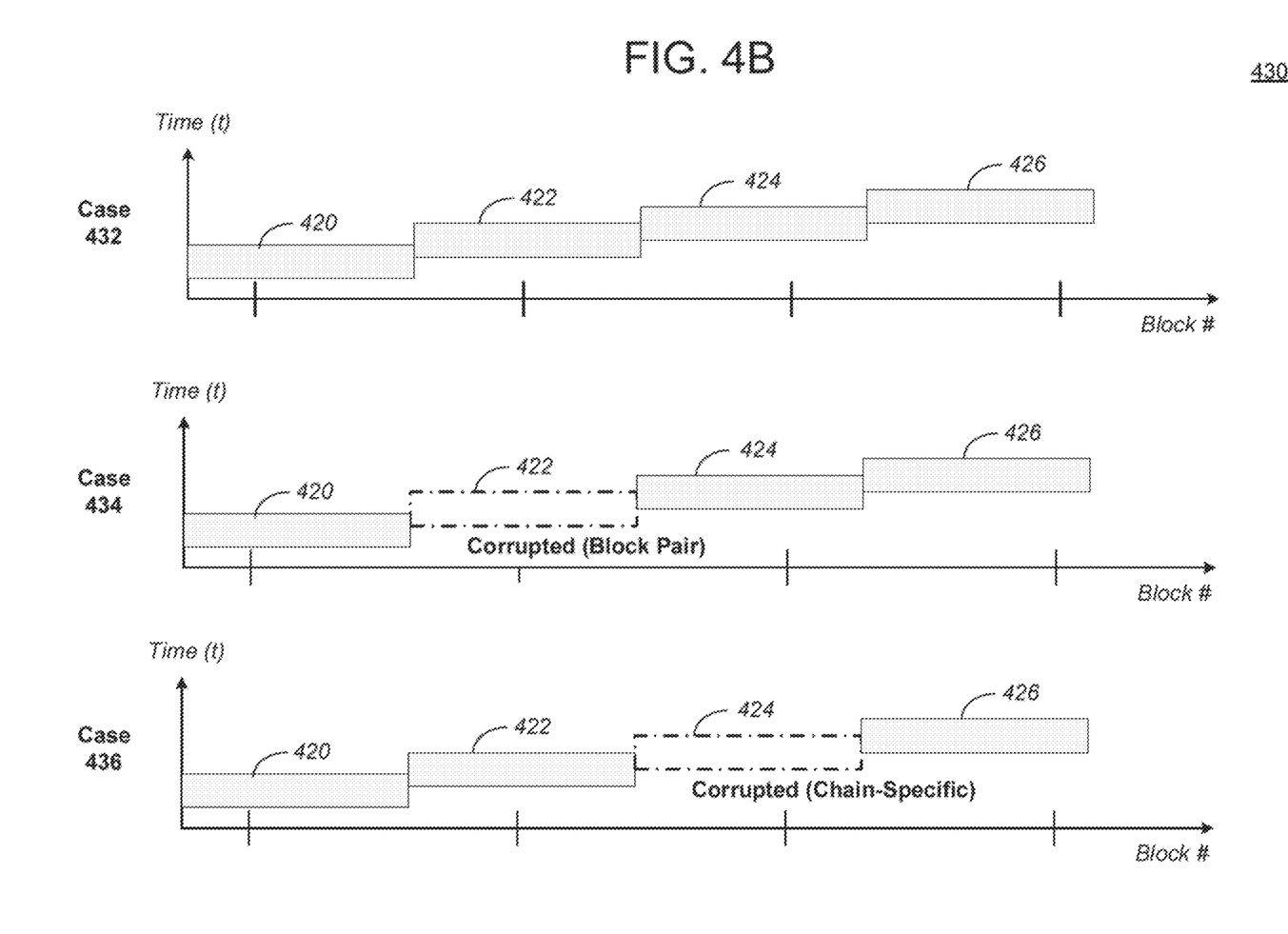

FIGS. 4A and 4B illustrate processes of auditing chain portions in accordance with an example embodiment. The audit chain engine may communicate with peer nodes of a blockchain (such as blockchain peer node 410). Here, the audit chain engine may access the blockchain via one or more blockchain peers. The audit chain engine supports the auditing of chains by the verification of the chaining integrity and of verifiable blocks. Here, chaining integrity may be verified by checking the integrity of the chain by standard blockchain verification mechanisms.

For example, private tokens may be stored on both the blockchain and the audit chain. The blocks holding these tokens may be referred to as verification blocks. Verification blocks are audited by comparing pairs of related tokens. For example, the audit chain engine may read the verification blocks from the private chain. Likewise, the audit chain engine may find the related source blocks on the audit chain, retrieve verification information (e.g. hash of source block(s) potentially further details). Based on the retrieved verification information, the audit chain engine may verify that all pairs (i.e., private token stored on the private blockchain and its corresponding copy stored on the audit chain) match each other. The comparison of token pairs may also be performed from the other way around, starting from the audit chain so that in any case orphaned verification blocks can be detected and reported. If all verification blocks in a selected time frame can be matched and the chain is also reported to be valid, the information on chain can be presumed trustworthy.

Referring to FIG. 4A, a process 400 includes triggers creating four different chain portions 420 (not shown in FIG. 4A), 422, 424, and 426 which can be used for verification from within a larger chain. The trigger mechanism described by the example embodiments enables portions of blocks to be verified at a time, rather than having to accredit an entire chain. In this example, the audit chain engine may receive a trigger and read block data from a source data block or blocks. In this example, a trigger causes the audit chain engine to read block data from block 02 (source block) and verify the hash of the source block 02. Results of the hash verification are stored as a private token in block 04 (verification block). In addition, a copy of the private token may be stored in a block of an external and independent audit chain (not shown). At a time of the writing of the private token within verification block 04, the block 03 has been further added to the blockchain. That is, at the time of reading source block 02, block 03 is not yet in existence. Between the reading of the block content and the storing of the private token, additional block(s) may be added to the chain.

The source block verification process may be repeatedly performed. For example, another trigger may cause the audit chain engine to read data from a source block 55 and store the verification results (private token) of the source block 55 in verification block 97. Likewise, the audit chain engine may store a copy of the private token of the source block 55 verification in a block of the audit chain.

In the example of FIG. 4A, chain portion 422 is between the source block 02 and the verification block 04. Chain portion 422 integrity can be derived from (i) the verification input of source block 02 being validated against the copy of the corresponding private token stored in the audit chain, and (ii) the integrity of the chain itself between source block 02 and verifiable block 04. Meanwhile, chain portion 426 is between the source block 55 and the verifiable block 97. Here, chain portion 426 integrity can be derived from (i) the verification input of source block 55 being validated against the private token stored in verification block 97 and (ii) the integrity of the chain itself between blocks 55 and 97. In addition, chain portion 424 is between the verification block 04 and the source block 55. Here, chain portion 424 integrity can be derived from the integrity of the chain itself between blocks 04 and 55. Furthermore, chain portion 424 is also located between verified source blocks 02 and verified source block 55. Therefore, portion 424 also indirectly benefits from these verifications.

FIG. 4B illustrates a user interface 430 displaying chain auditing results by the audit chain engine in accordance with an example embodiment. For example, the user interface 430 is shown with three different example cases 432, 434, and 436. In the first case 432, the four chain portions 420, 422, 424, and 426 are each verified by the audit chain engine. However, in the event that a portion cannot be verified for technical reasons such as shown in case 434 (e.g., because the source input cannot be matched to the verification block, etc.) the verification result by the audit chain engine shall report a corrupted block. In this example, block 04 is not able to be verified against source block 02. Therefore, chain portion 422 which include block 04 is marked as corrupted, although the underlying blockchain specific verifications (as mentioned at 0036) are validating correctly. Such a case can occur e.g. if the underlying chain has been subject to a collision attack.

Meanwhile, in the third case 436, the chain portion 424 is determined to be corrupted. Here, the audit chain engine determines from underlying blockchain-specific verifications (as mentioned at 0036) that the blockchain integrity of chain portion 424 has been compromised. Chain-level integrity for blocks 04 to 55 is rated as corrupted even though no source and verification block pair can be verified. The compromising of chain portion 424 can result from validation errors, for example, failure to verify the chain based on the hash content between the blocks in the chain portion 424.

When the audit chain engine verifies an underlying blockchain operated on a single node, that chain can be seen as more sensitive to attacks. No chain copy and no consensus mechanisms are available to prevent and reveal tampering. Consensus mechanisms are typically designed to avoid collision attacks. In a collision attack, the content of an individual block is modified while keeping the same hash value. Such attacks require (i) access to the chain, (ii) high computing power and (iii) can be made unlikely by further design choices. The audit chain engine described herein may not itself prevent or detect collision attacks, but does force an attacker into conducting one in order to remain undetected. Forcing an attacker into such a resource-consuming attack has extremely high dissuasive effect. Furthermore, introducing multiple-node operation would make it computationally more expensive as well as more difficult to organize such attacks can be conducted.

Figure 5:
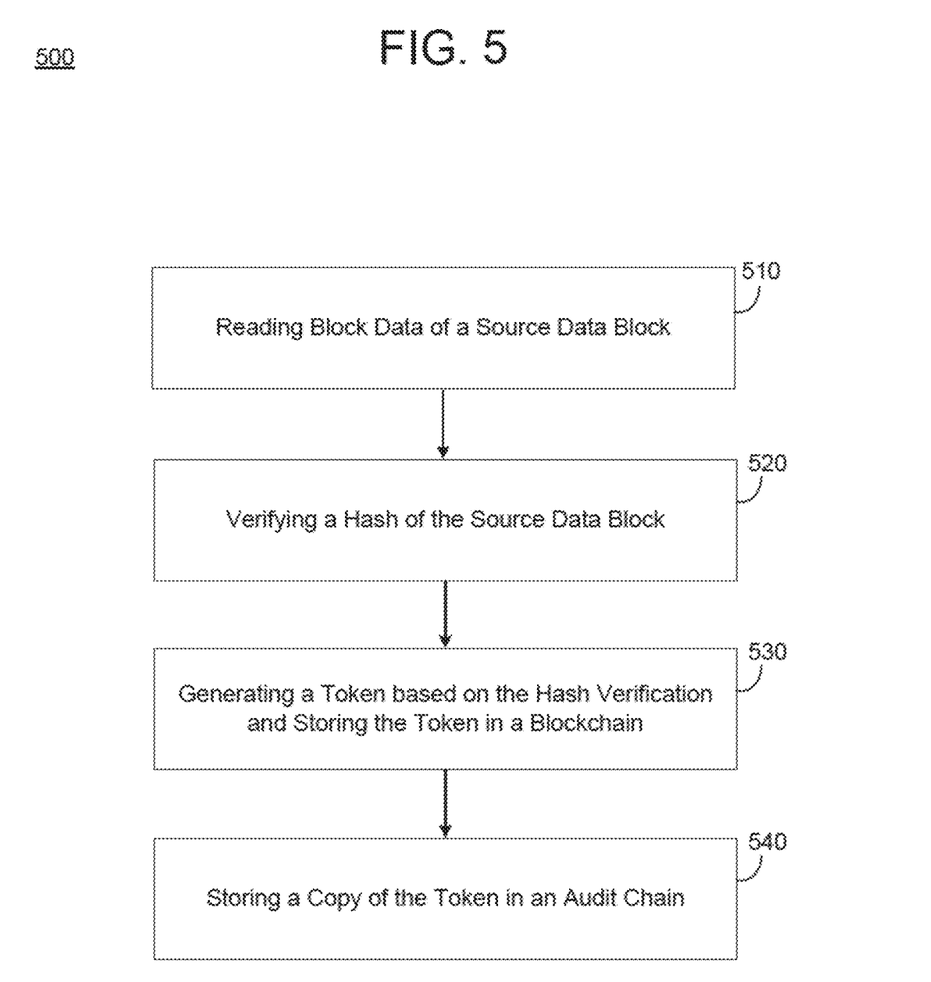
FIG. 5 is a diagram illustrating a method of verifying a blockchain via an audit chain in accordance with an example embodiment.

FIG. 5 illustrates a method 500 of verifying a blockchain (also referred to as an audited chain) via an audit chain in accordance with an example embodiment. For example, the method 500 may be performed by an engine that is executing on a database node, a cloud platform, a server, a computing system (user device), a combination of devices/nodes, or the like. Referring to FIG. 5, in 510, the method may include reading block data of a source data block that is stored among a hash-linked chain of data blocks on a blockchain.

For example, the block data may include data for verifying the integrity of a data block such as a block number, a block hash, data of previous blocks in the chain, data from a genesis block, and the like.

In 520, the method may include verifying a hash of the source block based on the block data that is read. Here, any known block verification mechanisms can be implemented. As one non-limiting example, a hash of a previous data block may be stored in a header of the source block. Here, the audit chain engine may regenerate the hash of the previous block based on block content of the previous block and a public key of the audited blockchain (e.g., peer node, etc.) and determine whether the regenerated hash is the same as the block hash retrieved from the data block. As another example, the hash of the source block may be generated (e.g., locally by the audit chain, etc.) based on a public key of the audited blockchain and the audit chain may compare the generated hash of the source block with the stored hash read from the source block.

In 530, the method may include generating a token based on the hash verification of the source block and storing the generated token in a verification block among the hash-linked chain of blocks on the audited blockchain to create a verification point on the blockchain. For example, the token may include information about the source block being verified such as the block number, information about the block verification (e.g., successful or not, etc.), information about the blockchain itself such as the unique URL, etc., and the like. In one example, the token may be stored in a unique verification block which does not include document content. Here, the verification block may be dedicated to storing a token exclusively and not any document content. As another example, the token may be stored in a generic block which also includes document content stored therein.

In some embodiments, the method may further include storing a copy of the generated token in a block among a hash-linked chain of blocks on an audit blockchain that is independent from the blockchain, in 540. By storing the copy of the token in a separate and independent audit chain, the system may provide a separate verification point within the audit chain which mirrors the verification point in the blockchain. Here, the audit chain may be a public chain (or private chain) which is not associated with the audited blockchain which can be private and permissions chain associated with a client, organization, or the like. Therefore, the audit chain may serve as an audit trail for the more detailed audited blockchain. For example, an auditor may verify the token stored in the blockchain is matched by the copy of the token stored in the audit chain when retrieving data from the blockchain.

In some embodiments, the reading of the block data is performed in response to a triggering event. For example, the triggering event may include at least one of a timer reaching a predetermined time interval and a block counter detecting storage of a predetermined number of blocks on the blockchain. In some embodiments, the reading of the block data and the storing of the generated token on the blockchain is performed via a first application programming interface (API) and the storing the copy of the generated token on the audit blockchain is performed via a second API.

In some embodiments, the method may further include reading a global source block from the audit chain, generating a global token based on a hash verification of the global source block, and storing the generated global token in another block among the hash-linked chain of blocks of the audit blockchain to create a global verification point on the audit blockchain. In this example, the method may further include storing a copy of the generated global token among the hash-linked chain of blocks on the blockchain.

Figure 6:
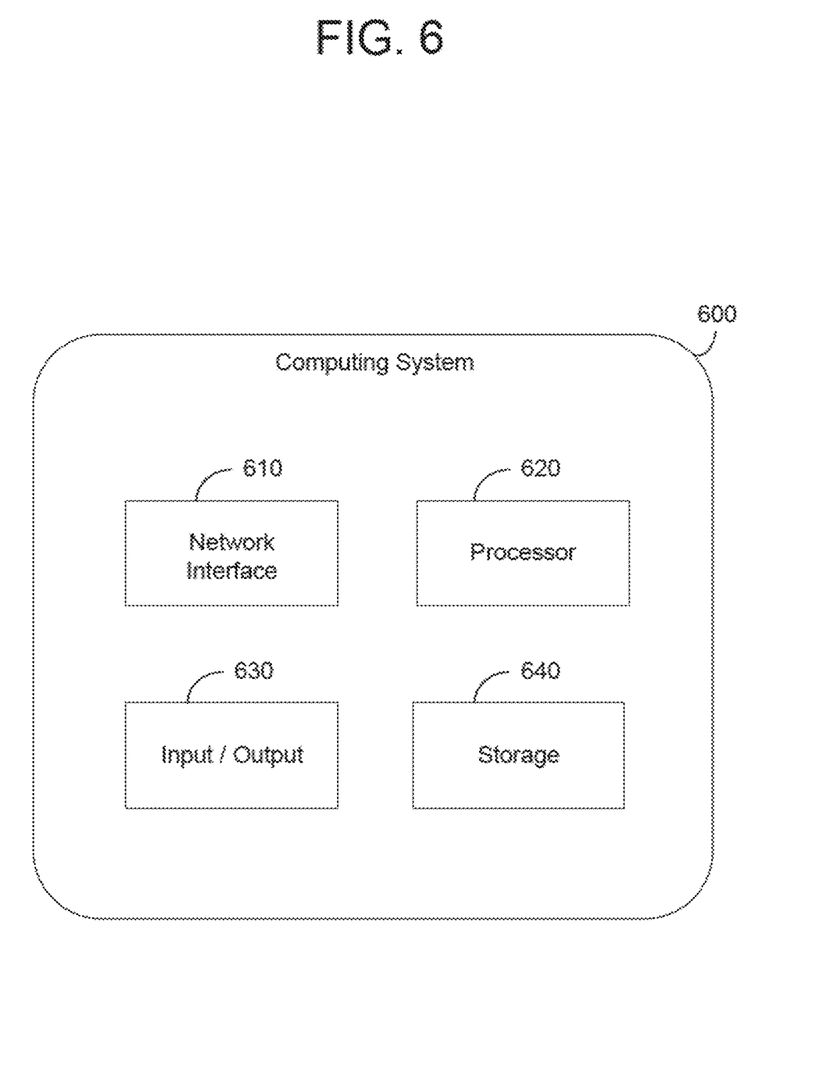
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, partitions and sub-partitions. The storage 640 may be used to store database records, items, entries, and the like. In some embodiments, the storage 640 may be configured to store instructions for implementing a trust service engine as described herein, which when executed, cause the processor 620 to carry out the functionality of the trust service engine.

According to various embodiments, the processor 620 may be coupled to a memory of the storage 640. Here, the processor may be configured to execute the program instructions within the memory. Based on the execution, the processor 620 may read block data of a source data block that is stored among a hash-linked chain of data blocks on a blockchain. Further, the processor 620 may be configured to verify a hash of the source block based on the block data that is read. The processor 620 may generate a token based on the hash verification of the source block and storing the generated token in a verification block among the hash-linked chain of blocks on the blockchain to create a verification point on the blockchain. The processor 620 may store a copy of the generated token in a block among a hash-linked chain of blocks on an audit blockchain that is independent from the blockchain.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a processor configured to
detect a triggering event associated with a blockchain ledger,
in response to detection of the triggering event, verify block hashes of a subset of blocks on the blockchain ledger and generate a verification token for the subset of blocks on the blockchain ledger based on the verification of the block hashes, and
store the verification token and block details of the subset of blocks in a block on a different blockchain ledger.

2. The computing system of claim 1, wherein the triggering event comprises detecting, by the processor, that a threshold number of blocks have been committed to the blockchain ledger since a previous verification token was created.

3. The computing system of claim 1, wherein the triggering event comprises detecting, by the processor, that a predetermined period of time has elapsed since a previous verification token was created.

4. The computing system of claim 1, wherein the triggering event comprises detecting a random request from a software application.

5. The computing system of claim 1, wherein the processor is further configured to store a chain identifier of the blockchain ledger with the verification token in the block on the different blockchain ledger.

6. The computing system of claim 1, wherein the processor is further configured to verify block hashes of a plurality of blocks on the different blockchain ledger and store a global verification token on the blockchain ledger based on the block hash verifications of the different blockchain ledger.

7. The computing system of claim 1, wherein the processor is configured to store identifiers of the subset of blocks and an indicator of whether the verification of the block hashes were successful via the block details in the block on the different blockchain ledger.

8. The computing system of claim 1, wherein the subset of blocks on the blockchain ledger comprise a partial and continuous sequence of blocks that were previously committed to the blockchain ledger.

9. The computing system of claim 1, wherein the processor is further configured to generate an additional verification token for a different subset of blocks on the blockchain ledger in response to an additional trigger, and store the additional verification token for the different subset of blocks in another block on the different blockchain ledger.

10. A method comprising:
detecting a triggering event associated with a blockchain ledger;
in response to detection of the triggering event, verifying block hashes of a subset of blocks on the blockchain ledger and generating a verification token for the subset of blocks on the blockchain ledger based on the verification of the block hashes; and
storing the verification token and block details of the subset of blocks in a block on a different blockchain ledger.

11. The method of claim 10, wherein the detecting the triggering event comprises detecting that a threshold number of blocks have been committed to the blockchain ledger since a previous verification token was created.

12. The method of claim 10, wherein the detecting the triggering event comprises detecting that a predetermined period of time has elapsed since a previous verification token was created.

13. The method of claim 10, wherein the detecting the triggering event comprises detecting a random request from a software application.

14. The method of claim 10, wherein the storing comprises storing a chain identifier of the blockchain ledger with the verification token in the block on the different blockchain ledger.

15. The method of claim 10, wherein the method further comprises verifying block hashes of a plurality of blocks on the different blockchain ledger and store a global verification token on the blockchain ledger based on the block hash verifications of the different blockchain ledger.

16. The method of claim 10, wherein the storing comprises storing identifiers of the subset of blocks and an indicator of whether the verification of the block hashes were successful via the block details in the block on the different blockchain ledger.

17. The method of claim 10, wherein the subset of blocks on the blockchain ledger comprise a partial and continuous sequence of blocks that were previously committed to the blockchain ledger.

18. The method of claim 10, wherein the method further comprises generating an additional verification token for a different subset of blocks on the blockchain ledger in response to an additional trigger, and storing the additional verification token for the different subset of blocks in another block on the different blockchain ledger.

19. A non-transitory computer-readable medium comprising instructions which when executed by a processor cause a computer to perform a method comprising:

detecting a triggering event associated with a blockchain ledger;

in response to detection of the triggering event, verifying block hashes of a subset of blocks on the blockchain ledger and generating a verification token for the subset of blocks on the blockchain ledger based on the verification of the block hashes; and     storing the verification token and block details of the subset of blocks in a block on a different blockchain ledger.

20. The non-transitory computer-readable medium of claim 19, wherein the detecting the triggering event comprises detecting one or more of a threshold number of blocks being committed to the blockchain ledger since a previous verification token was created, detecting that a predetermined period of time has elapsed since a previous verification token was created, and detecting a random request from a software application.

\* \* \* \* \*